United States Patent [19]

Sasse et al.

[11] Patent Number: 4,569,971
[45] Date of Patent: Feb. 11, 1986

[54] HARDENERS FOR EPOXY RESINS

[75] Inventors: H. Rainer Sasse, Aachen; Karl-Hermann Conrad, Moers; Rolf Herzog, Bottrop; Hans Klein, Hubert; Bert Meier, Wesel-Blumenkamp, all of Fed. Rep. of Germany

[73] Assignee: Rutgerswerke Aktiengesellschaft, Fed. Rep. of Germany

[21] Appl. No.: 523,628

[22] Filed: Aug. 15, 1983

[30] Foreign Application Priority Data

Aug. 26, 1982 [DE] Fed. Rep. of Germany ....... 3231730
Mar. 31, 1983 [DE] Fed. Rep. of Germany ....... 3319675

[51] Int. Cl.$^4$ ............................................. C08G 69/26
[52] U.S. Cl. ................................ 525/109; 525/111.5; 525/113
[58] Field of Search ..................... 525/109, 111.5, 113

[56] References Cited

U.S. PATENT DOCUMENTS 3,280,215 10/1966 Severance et al. ................. 525/113
3,316,187 4/1967 Grosner et al. .................... 525/113

Primary Examiner—John Kight
Assistant Examiner—Kriellion Morgan
Attorney, Agent, or Firm—Bierman, Peroff & Muserlian

[57] ABSTRACT

Novel hardener compositions for epoxy resins comprising (a) 65 to 95% by weight of an adduct containing free amino groups of 35 to 94% by weight of at least one member of the group consisting of polyamines, polyaminoimidazolines and polyaminoamides and 5 to 30% by weight of at least one glycidyl compound, based on the total hardener composition weight, (b) 0.1 to 5% by weight at least one aliphatic or aromatic carboxylic acid and (c) 0.9 to 30% by weight of a phenol-modified aromatic hydrocarbon resin with a hydroxyl content of 0.9 to 6% and their preparation, water-emulsifiable epoxy compositions containing said hardener compositions, aqueous emulsions of said epoxy resins, water compositions containing said aqueous epoxy emulsions and their uses.

17 Claims, No Drawings

HARDENERS FOR EPOXY RESINS

STATE OF THE ART

The combination of hydraulic binders such as gypsum, anhydrite, lime, cement and mixtures thereof with aqueous emulsions or suspensions of thermoplastic or duroplastic resins and the production of mortar materials therefrom having improved properties is known such as in German Pat. No. 1,159,839 and DE-OS No. 1,595,467. The hardeners used for these compositions are polyamines, polyimidazolines and polyaminoamides.

DE-OS No. 1,595,467 teaches that the epoxy resin-hardener dispersions require tensides or glycols as stabilizers but this causes a decrease in adhesion to the substrate and lowers the internal strength of building elements produced therefrom or increases the inherent tendency of the epoxy resin to separately harden in the mixture with the hydraulic binder. While the building elements obtained thereby are improved, the improvements are not generally deemed adequate since other properties of the said elements such as resistance to frost and to rock salt are not satisfactory.

The main reason for these unsatisfactory results is the detrimental internal strains resulting from the resin distribution in the stone structure, particularly due to spherical and film-like resin agglomerations which interfere with internal stress flow and impede the adhesion between the new formations of cement hydrates. Moreover, the motars obtained by this means possess sufficient fluidity determined by the spreading test of DIN 1045 and 1164 only with uneconomically high proportions of epoxy resin.

For these reasons, building elements with epoxy resin additives have been used only on a limited scale although epoxy resins are known to be valuable resins with exceptional adhesive and strength characteristics. Therefore, those skilled in the art have been searching for water emulsifable epoxy resin systems and aqueous emulsions prepared possessing adequate stability, preferably without wetting and/or dispersing agents and which when admixed with hydraulic binders and aggregate material, preferably in small amounts, result in building elments with improved strength and stability. This requires the resin present in the set cement to be in extremely fine dispersion form and agglomeration with the cement hydrates must take place at the same time with a balance between the surface tensions of the resin and the cement. The mortar masses also must have a high degree of spreadability and good handling characteristics and the hardened elements should be substantially pore-free.

OBJECTS OF THE INVENTION

It is an object of the invention to provide a novel hardener for epoxy resins and epoxy resin compositions containing the same.

It is a further object of the invention to provide aqueous emulsions of epoxy resins with the improved hardener and mixtures of said aqueous emulsions with hydraulic binders.

It is an additional object of the invention to provide a novel method of coating metal pipes by protecting steel elements and repairing old concrete.

These and other objects and advantages of the invention will become obvious from the following detailed description.

THE INVENTION

The novel hardener compositions of the invention for epoxy resins are comprised of (a) 65 to 95% by weight of adduct containing free amino groups of 35 to 94% by weight of at least one member of the group consisting of polyamines, polyaminoimidazolines and polyaminoamides and 5 to 30% by weight of at least one glycidyl compound, based on the total hardener composition weight, (b) 0.1 to 5% by weight at least one aliphatic or aromatic carboxylic acid and (c) 0.9 to 30% by weight of a phenol-modified aromatic hydrocarbon resin with a hydroxyl content of 0.9 to 6%.

The glycidyl component of the hardener adduct may be any mono- or polyfunctional epoxy component and many suitable glycidyl components are described in the Handbook of Epoxy Resins by Lee and Neville published by McGraw-Hill Inc. (1967). Low viscosity mono- and polyfunctional glycidyl compounds are described by Pilng et al [Kunstsoffe, Vol. 67 (1977) p. 783–790] and these so-called reaction thinners lower the processing viscosity when admixed with higher molecular weight epoxy resins. Preferred glycidyl compounds are bisphenol -A and bisphenol -F based resins with an epoxy equivalent of 175 to 500, especially when admixed with low viscosity mono- and difunctional glycidyl compounds.

The amine component of the adduct is at least one member selected from the group consisting of polyaminoimidazolines, polyamines and polyaminoamides. They may be used individually or in admixture with each other. Examples of polyamines are diethylenetriamine, triethylenetetramine, pentamethylenehexamine, iminobispropylamine, dimethylaminopropylamine and aminoethylethanolamine.

The polyaminoamides used in the invention are known reaction products of polyamines with saturated, preferably mono- or polyunsaturated fatty acids. Examples of the polyunsaturated fatty acids present in natural oils such as linseed oil, tall oil or castor oil in the form of fatty acid derivatives are 9,11-octadecadienoic acid, 9,12-octadecadienoic acid, linoleic acid, linolenic acid, α-elaeostearic acid and β-elaeostearic acid. It is understood that corresponding and similar synthetic fatty acids can also be used as the starting material and the fatty acids can be used as amide component either singly or as mixtures. The commericially available mixtures of such acids containing unsaturated as well as saturated fatty acids such as oleic acid, stearic acid or palmitic acid are preferred for economic reasons.

The amine components of the polyaminoamides are amines with at least one primary and at least one secondary amino group and these amines can also contain an hydroxyl group. Examples of such compounds are diethylenetriamine, triethylenetetramine, tetraethylpentamine, methylaminopropylamine, tetrapropylenepentamine, pentaethylenehexamine, N'N-bis-(3-aminopropyl)-ethylenediamine, N-(2-aminoethyl)-aminopropylamine, 3-amino-1-methylaminopropane, 3-amino-1-cyclohexylaminopropane, N-oleyl-1,3-diaminopropane, N-dodecyl-1,3-diaminopropane, N-cetyl-1,3-diaminopropane, 1-(2-aminoethyl)-piperazine, N-(2-hydroxyethyl)-aminoethylamine.

The polyaminoimidazoles, which like the polyaminoamides are prepared by reaction of polyamines with fatty acids but at higher temperatures, are a special group of polyamines that can be used for the preparation of the adducts used in the invention and these imidazole compounds are known as hardeners for epoxy resins, and any commercially available polyaminoimidazolines can be used for the formation of the adducts according to the invention.

The adducts are prepared by reaction of 35 to 94% by weight of the selected polyamino compounds with 5 to 30% by weight of one or several glycidyl compounds at temperatures in the range from 60° to 100° C. for several hours, and the amount of glycidyl compound is less with respect to the reactive amino groups so that the adduct contains free amino groups in any case.

The second component of the hardener component of the invention consists of 0.1 to 0.5% by weight of at least one aliphatic or aromatic carboxylic acid. Substituted or unsubstituted aliphatic, cycloaliphatic or aromatic mono-,di- or tri-carboxylic acids with 1 to 8 carbon atoms can be used as the carboxylic acid. Examples of suitable carboxylic acids are formic acid, acetic acid, propionic acid, oxalic acid, malonic acid, succinic acid, glutaric acid, adipic acid, maleic acid, trimethylacetic acid, chloroacetic acid, chloropropionic acid, glycolic acid, lactic acid, vinylacetic acid, tartaric acid, citric acid, benzoic acid, phenylacetic acid, phthalic acid, tetrahydrophthalic acid, or hexahydrophthalic acid which may be used individually or in mixtures.

The third component of the hardener composition is an aromatic hydrocarbon resin containing hydroxyl groups which is used in an amount of 0.9 to 30% by weight preferably in an amount of 10 to 30% calculated with respect to the total hardener. Aromatic hydrocarbon resins are prepared by catalytic polymerization of mainly aromatic unsaturated hydrocarbons from the distillates of high temperature coal tar boiling in the temperature range from 140° to approximately 220° C. or from the fraction boiling in the range from 160° to 220° C. obtained during the cracking of naphtha or coal oil as well as during the pyrolysis of cracking residues, which is called the rosin oil fraction. These fractions contain mainly indene, vinyltoluene, methylindene, cumarone, dicyclopentadiene, methyldicyclopentadiene, styrene and α-methylstyrene as unsaturated aromatic compounds.

The resins contain hydroxyl groups, and thereby add polar and hydrophilic properties by copolymerization with phenolic compounds such as phenol, alkyl-substituted phenols or polyvalent phenols and specific OH-numbers in the modified hydrocarbon resins can be obtained by adjusting the amount of phenolic groups added by polymerization. Phenol-modified aromatic hydrocarbon resins with an hydroxyl content of 0.9 to 6%, preferably with 1.5 to 3%, can be used.

Although the carboxylic acid can be added to polyamino compounds before the addition reaction, in the preferred practical example, parts 2 and 3 of the hardener components are mixed directly into the adduct of the glycidyl compound and polyamino compound after the latter's formation. The resulting hardeners are highly viscous products with a long storage capacity and either are soluble in water or form an emulsion readily with water, and the respective emulsions are also stable in storage. Thus the hardener component can be offered on the market either as undiluted product or as aqueous solution or emulsion.

For use, the undiluted product is also dissolved in water or emulsified, then mixed with the liquid epoxy resin component and emulsified. The hardener and epoxy resin are preferably used in approximately equivalent amounts, calculated with respect to active hydrogen atoms in the amine and reactive epoxy groups for this purpose. But it is also possible to use hardener and epoxy resin component in excess and lesser amount, respectively i.e. a hardener composition: epoxy resin ratio of 0.7 to 1.3. The obtained emulsions are also sufficiently stable without emulsifiers and dispersing agents so that the emulsion does not break upon the addition of hydraulic binders, additives and aggregates.

The hardener composition is dissolved in water or emulsified with water and then mixed with vigorous agitation with the corresponding amount of epoxy resin without the addition of a tenside or any other emulsifier or dispersing agent. The aqueous emulsion prepared by this method has a pot life of approximately ½ to 8 hours depending on the combination and can be mixed within this time with hydraulic binders and, if needed, fillers and aggregate. The addition to the hydraulic binders can be carried out by adding the epoxy resin/hardener emulsion to the complete construction mix premixed with water, or by mixing the epoxy resin emulsion first with the mixing water and then adding the binder and aggregate materials.

In another simplified practical example, the hydrous or anhydrous hardener composition is dissolved or emulsified in the mixing water of the hydraulic binder, then the resin component is added and the emulsified mixture and binder, aggregates and, if meeded, remaining water are added.

The improved construction materials prepared by this method can then be hardened to form building elements that are substantially pore-free, even when the epoxy resin emulsion of the invention is used in small amounts, and they have excellent strength, good resistance to frost and rock salt and good adhesion to the respective substrate. Moreover, the surprising observation was made that, concrete samples prepared by this method do not show any measurable tendency in the phenolphthalein test to form carbonates underground or after prolong storage out-doors (cf. Wesche, Beton 2, Section 3.3.7.1, p. 79, Bauverlag Wiesbaden-Berlin, edition 1981).

Consequently, the effect of the alkaline-reacting cement stone which renders embedded metallic reinforcing elements passive is retained over a very long time, longer than has been known with normal, unmodified concrete and this means that embedded concrete steel elements have a high stability also against corrosion. The new mortar is superior to thermoplastic polymers in this property.

Also to be mentioned is the liquefying effect of the epoxy resin/hardener system of the invention in freshly prepared mortar, characterized by a high spreading test according to DIN 1045 and 1164 which means in practice an improved pumping quality and improved further processability. A great stability of the hardened construction materials against the formation of cracks in the micrometer range should be emphasized and construction elements of the invention have a drastically reduced tendency to form micro-cracks even at a very high water/cement factor. In addition, the mixtures of epoxy resins and hardeners result in a low pore content in the mortar, even when the specified amount is exceeded.

Because of the properties of the emulsifiable epoxy resin systems of the invention and the hydraulic binders improved with these, the epoxy resin systems in combination with hydraulic binders, fillers and/or aggregates can be used to solve problems in various fields of technology such as for the coating of metal pipes, for the production of semi-rigid layers, injection mortars or rock anchors.

Metal pipes, particularly steel and/or cast iron pipes that are laid underground or under water, usually need a dependable internal and external protection against corrosion and a layer of concrete is normally used for internal protection and a layer of concrete or a coating of bitumen, a lacquer or a plastic is used as the external protection. The outside layers of lacquers, plastics or bitumen paints are relatively sensitive to mechanical damage and the conventional concrete layer also has several disadvantages. For example, concrete is not resistant to every type of water and acid water, water containing chlorides, sulfides or sulfates as well as soft water can corrode concrete. The alkali reserve of the concrete is depleted by reaction with carbon dioxide, so-called carbonatation and this is especially important for pipes that are not always completely filled. Cracks can develop during the setting of the cement, but also during the laying of the pipes as well as already laid pipes due to earth movements, and these bring the corrosive water in contact with the iron pipe. Damage occurs very easily, particularly in water exchange zones.

The repairing of old concrete with fresh motar is difficult and an adhesive must be used to achieve adequate bonding between the two. The concrete layer of the external coating develops fractures very easily due to mechanical stress and the danger of corrosion by carbonic acid is also frequently increased in this case. Because of this carbonatation of the concrete, iron pipes laid above ground are not coated with concrete.

Solutions are known for various problems such as the reinforcement of the concrete with steel or with fibers, limited storage in the air of coated pipes, as well as the improvement of the concrete with plastic resins such as thermoplasts and also epoxy resins. This improvement increases the concrete's resistance especially against aggressive water and reduces the formation of cracks, but the danger of carbonatation reactions in the concrete is not decreased.

In contrast to this, the observation was made that mortars containing the epoxy resin emulsions of the invention are exceptionally suitable for the internal and external coating of metal pipes, especially steel and cast iron pipes and the resulting concrete coatings do not have any of the described disadvantages.

This type of cement mortar even when containing small amounts of the epoxy resin emulsion of the invention, sets into a concrete that adheres well to old concrete and onto metallic substrates, is largely pore-free and has therefore excellent strength. For an increase in this strength for external coatings, for example, reinforcing fiber materials such as organic fibers or alkali-resistant fiberglass may be added to such mortars. An addition of small amounts such as 0.5 to 1%, calculated with respect to the total hardener component, of an epoxy-modified silane is recommended to increase the bonding between the fiberglass and epoxy component.

Besides the above, it was found that concrete elements prepared by this method showed no measurable tendency to underground carbonatation when tested by the phenolphthalein test [Wesche, Beton 2, Section 33.7.1., p. 79, Bauverlag Wiesbaden-Berlin, edition (1981)], even after long outside storage. Therefore, the effect of the alkaline-reacting cement stone rendering embedded metallic elements passive is maintained for a very long period of time, longer than is known with normal, unmodified concrete. This means a high degree of stability against corrosion for coated metal pipes and the new mortar is also superior in this property to the types of concrete modified with known polymers.

Also favorable is the liquefying effect of the epoxy resin/hardener system on fresh mortar characterized by a high spread test according to DIN 1045 and 1164 and this permits the batching of mortar mixtures with low water/cement factors without the addition of another concrete liquifier which is a requirement for this type of application. A high stability of the hardened building materials against crack formation in the micrometer range is to be emphasized. For example, building materials of the invention show a drastically reduced tendency to form micro-cracks, even with a high water/cement ratio. In addition, the epoxy resin/hardener mixtures of the invention lead to a low pore content of the mortar, even when the specified amount of water is exceeded.

As a result of the special composition of the resin and hardener components, fresh mixtures of the mortar of the invention adhere very well to old, conventional concrete as as well as to old concrete produced with this mortar without the addition of an adhesive. A possibly needed repair of a concrete coating of the invention is therefore a simple task with the same mortar.

The so-called semi-rigid coatings of a well-known process described in DE-PS No. 12 51 358 are used for laying down strips for airports, gas stations, storage buildings and similar industrial projects and for this purpose, a bituminous or mastic asphalt layer is spread on the substrate and is coated with a cement mortar of the proper consistency so that the cement mortar can penetrate the mastic asphalt layer to a specified depth. Then, all the layers are compacted to produce a semi-rigid cover which combines the pliability of the bituminous coating with the resistance of the concrete cement.

However, there are several problems due to the shrinking process of the hardened concrete mortar which can result in a reduced strength and resistance to alternate freezing and thawing and it was been observed that these problems are eliminated when the epoxy resin emulsion of the invention is added to concrete mortar in an amount of 2.5 to 10% by weight. The reduced shrinkage and the prevention of micro-cracks resulting from this addition lead to a definite improvement.

There are other advantages: The mortar spreads more easily because of its low surface tension and cement crystallites and the aggregate undergo additional bonding and the bonding between the bituminous layer covered with organic material and thus all the mechanical properties are improved.

An injection mortar is applied to stressed members of prestressed reinforced steel concrete constructions after stress and all cavities of the tension channel must be completely filled. Very high demands with respect to shrinkage, fluidity, constancy of volume, pressure resistance and frost resistance are made on the injection mortar since these frequently cause problems in the practical application and these requirements are fully met by the use of the epoxy resin emulsion of the invention in injection mortar.

For rock reinforcement in mines or tunneling operations, fluid masses are pressed into existing cavities where they harden and anchor the rock formations. Besides such rock anchors that are based with plastics alone and which are used only in special circumstances because of the high costs of their raw materials, rock anchors based on cement are most commonly used. Again in this field of application, the observation was made that the cement-bonded rock anchors containing the epoxy resin emulsions of the invention offer considerable advantages over the conventional cement-bonded rock anchors. For example, the epoxy resin emulsion of the invention results in greater strength, better adhesion to the substance, a greater ductile strength and a better resistance to aggressive attacks such as e.g. by mountain water containing carbonic acid.

In the following examples there are described several preferred embodiments to illustrate the invention. However, it should be understood that the invention is not intended to be limited to the specific examples.

EXAMPLE 1

A mixture of 700 g of a commerically available polyaminoamide containing polyaminoimidazole with an amine equivalent of 95 and 100 g of a diglycidyl ether of bisphenol-A with an epoxy equivalent of 190 g was stirred at 90° C. for two hours and then 10 g of lactic acid and 190 g of a phenol-modified aromatic hydrocarbon resin with a hydroxyl content of 3% were added to the mixture which was then cooled to obtain a light-brown, liquid product with a viscosity of 8,600 mPa's at 25° C. which was designated hardener A.

195 g of hardener A were added with stirring to 330 g of water and then 250 g of a bisphenol-A epoxy resin with an epoxy equivalent of 190 and a viscosity of 12,000 mPa's at 25° C. were added thereto. The mixture was emulsified with vigorous stirring and then 5 kg of Portland cement PZ 35, 15.5 kg of standard sand according to DIN 1164 and 1,450 g of water were added to the epoxy resin emulsion with vigorous stirring. The water to cement ratio was 0.36 and the resulting mixture was a properly fluid material that could be pumped. The material had a density of 2,270 kg/m³ and had a value of 160 mm in the spreading test of DIN 1164. Samples measuring 4×4×16 mm were prepared from the mixture and the hardened mortar was tested outdoors for strength using the test of part 7 of DIN 1164 for 12 months.

| Result after | 7 days | 28 days | 360 days |
| --- | --- | --- | --- |
| Bending strength in N/mm² | 8 | 14 | 17 |
| Compressive strength in N/mm² | 45 | 67 | 103 |

The samples were substantially pore-free and were resistant to frost and to rock salt even after 12 months and the phenolphthalein test after 12 months showed no carbonate formation.

EXAMPLE 2

A mixture of 495 g of a commerical polyaminoamide containing polyaminoimidazoline and 55 g of tetraethylenepentamine having an amine equivalent of 77 was reacted at 80° C. with stirring for two hours with a solution of 150 g of solid diglycidyl ether of bisphenol A in 15 g of ethylhexyl glycidyl ether with an epoxy equivalent of 180. The resulting adduct was mixed with 5 g of acetic acid and 292 g of a phenol-modified cumarone-indene resin with a hydroxyl content of 2.5% and the mixture was cooled to obtain a dark-brown mixture with a viscosity of 12,000 mPa's at 25° C. The mixture was emulsified with 1000 g of water with vigorous stirring to obtain hardener B emulsion.

A mixture of 400 g of hardener B emulsion and 250 g of a bisphenol-A epoxy resin with an epoxy equivalent of 190 and a viscosity of 12,000 mPa's at 25° C. was emulsified with vigorous stirring and using the procedure of Example 1, the emulsion was admixed with 5.0 kg of Portland cement PZ 35, 15.5 kg of standard sand and 1,600 g of water (water-cement ratio of 0.360) to form a mortar which was fluid and could be pumped. The mixture had a density of 2,285 kg/m³ and had a value of 170 mm in the spreading test of DIN 1164. Test samples were prepared and tested as in Example 1 and the results are reported in the following Table.

| Test results after | 7 days | 28 days |
| --- | --- | --- |
| Bending strength in N/mm² | 7 | 13 |
| Compressive strengh in N/mm² | 43 | 63 |

The samples were substantially pore-free and the test samples were resistant to frost and to rock salt in the 12 month outdoor test. The phenolphthalein test after 12 months showed no carbonate formation.

COMPARISON EXAMPLE 3

Using the procedure of Example 1, a mixture of Portland cement PZ 35, sand and water with a water-cement ratio of 0.4 without any epoxy resin or hardener was prepared and the mixture had a density of 2,310 kg/m³ and a value of 185 mm in the spreading test of DIN 1164. Test samples were prepared as in Example 1 and were tested with the results of the following Table.

| Results after | 7 days | 28 days | 360 days |
| --- | --- | --- | --- |
| Bending strength in N/mm² | 6 | 8 | 9.5 |
| Compressive strength in N/mm² | 41 | 60 | 65 |

The samples showed distinct crack formation and surface peeling after the 12 month outdoor test and the phenolphthalein test showed after 12 months a carbonate depth of 1.2 mm.

COMPARISON EXAMPLE 4

Using the procedure of Example 1, a mortar mixture was prepared from 250 g of a bisphenol-A epoxy resin, 125 g of a polyaminoamide hardener, 5,625 g of Portland cement PZ 35, 22,250 g of sand with a grain size of 0 to 4 mm and 2,063 g of water (water:cement ratio of 0.367) and the mixture had a density of 2,170 kg/m³ and a value of 140 mm in the spreading test of DIN 1164. Samples were prepared and tested as in Example 1

| Result after | 7 days | 28 days |
| --- | --- | --- |
| Bending strength in N/mm² | 6 | 7 |
| Comparessive strength in N/mm² | 29 | 39 |

The test samples showed slight crack formation at the surface in the 12 month outdoor test and the phenolphthalein test after 12 months showed a carbonate depth of 2.5 mm which meant the samples were unsatisfactory.

Various modifications of the compositions and processes of the invention may be made without departing from the spirit or scope thereof and it should be understood that the invention is intended to be limited only as defined in the appended claims.

What we claim is:

1. A hardener composition for epoxy resins consisting essentially of (a) 65 to 95% by weight of adduct containing free amino groups of 35 to 94% by weight of at least one member of the group consisting of polyamines, polyaminoimidazolines and polyaminoamides and 5 to 30% by weight of at least one glycidyl compound, based on the total hardener composition weight, (b) 0.1 to 5% by weight of at least one aliphatic or aromatic carboxylic acid and (c) 0.9 to 30% by weight of a phenol-modified aromatic hydrocarbon resin with a hydroxyl content of 0.9 to 6% by weight of the entire resin.

2. A composition of claim 1 wherein the hydroxy group content of the hydrocarbon resin is 1.5 to 3%.

3. A composition of claim 1 wherein the glycidyl component is selected from the group consisting of bisphenol-A resins and bisphenol-F resins having an epoxy equivalent of 175 to 300.

4. A composition of claim 3 wherein the glycidyl component is mixed with at least one low viscosity mono- and/or difunctional gylcidyl component.

5. A composition of claim 1 wherein the amine component is a polyamine selected from the group consisting of diethylenetriamine, triethylenetetramine, pentamethylenehexamine, iminobispropylamine, dimethylaminopropylamine and aminoethylethanolamine.

6. A composition of claim 1 wherein the amine component is a polyaminoamide of a polyamine and at least one member of the group consisting of mono- and poly-unsaturated fatty acids.

7. A composition of claim 1 wherein the acid component has 1 to 8 carbon atoms.

8. An epoxy resin system emulsifiable with water comprising a liquid epoxy resin and a hardener composition of claim 1.

9. A system of claim 8 wherein the hydroxy group content of the hydrocarbon resin is 1.5 to 3%.

10. A system of claim 8 wherein the glycidyl component is selected from the group consisting of bisphenol-A resins and bisphenol-F resins having an epoxy equivalent of 175 to 300.

11. A system of claim 10 wherein the glycidyl component also contains a low viscosity mono- and/or difunctional gylcidyl component.

12. A system of claim 8 wherein the amine component is a polyamine selected from the group consisting of diethylenetriamine, triethylenetetramine, pentamethylenehexamine, iminobispropylamine, dimethylaminopropylamine and aminoethylethanolamine.

13. A system of claim 8 wherein the amine component is a polyaminoamide of a polyamine and at least one member of the group consisting of mono- and poly-unsaturated fatty acids.

14. A system of claim 8 wherein the acid component has 1 to 8 carbon atoms.

15. An aqueous emulsion of the epoxy system of claim 8.

16. An aqueous emulsion of claim 15 wherein the phenol-modified aromatic hydrocarbon resin has a hydroxyl content of 1.5 to 3%.

17. A process for the preparation of the hardener composition of claim 1 comprising reacting a mixture of 5 to 30% by weight of at least one glycidyl and 35 to 94% by weight of at least one member of the group consisting of polyamines, polyaminoimidazolines and polyaminoamides at 60° to 100° C. to form an adduct containing free amino groups and admixing the adduct with 0.1 to 5% by weight of at least one aliphatic or aromatic carboxylic acid and 0.9 to 30% by weight of a phenol-modified aromatic hydrocarbon resin with a hydroxyl content of 0.9 to 6%.

* * * * *